United States Patent [19]

Davis

[11] Patent Number: 5,206,625
[45] Date of Patent: Apr. 27, 1993

[54] BRAKE WEAR INDICATOR

[76] Inventor: William E. Davis, 2615 Charter Hill Place, Coquitlam, British Columbia, Canada, V3E 1R8

[21] Appl. No.: 722,206

[22] Filed: Jun. 27, 1991

[51] Int. Cl.⁵ ............................................. B60Q 1/00
[52] U.S. Cl. .................... 340/454; 340/453; 188/1.11
[58] Field of Search ............... 340/453, 454; 116/208; 188/1.11

[56] References Cited

U.S. PATENT DOCUMENTS

| | | | |
|---|---|---|---|
| 4,279,214 | 7/1981 | Thorn | 116/208 |
| 4,800,991 | 1/1989 | Miller | 340/454 X |
| 4,855,712 | 8/1989 | Wiley, Jr. et al. | 340/453 |
| 4,945,818 | 8/1990 | Ware | 188/1.11 X |
| 4,989,537 | 2/1991 | Hutchinson, Sr. et al. | 116/208 |
| 5,044,302 | 9/1991 | Goldfein et al. | 116/208 |

Primary Examiner—Jin F. Ng
Assistant Examiner—Christine K. Oda
Attorney, Agent, or Firm—Bull, Housser & Tupper

[57] ABSTRACT

An apparatus for monitoring brake condition for an air actuated diaphragm spring brake actuator provides a visual or audible signal when brake wear causes a brake push rod to move past a pre-determined distance with respect to the brake actuator housing. The indicator includes an engaging mechanism to retain the indicator in its operative position irrespective of subsequent movement of the push rod. A continuous record of brake failure or serious brake wear or misalignment is thereby provided.

9 Claims, 6 Drawing Sheets

BRAKE WEAR INDICATOR

BACKGROUND OF THE INVENTION

1. Field of the Invention

This invention relates to air-actuated diaphragm spring brakes having a push rod actuator. More particularly, this invention relates to an apparatus which alerts observers that the brakes are seriously worn or not functioning properly, such indication remaining active irrespective of subsequent positioning of the push rod.

2. State of the Prior Art

Air brake systems which provide an indication to the operator of excess wear or misadjustment of vehicle brakes have previously been described. See for example U.S. Pat. No. 4,855,712 issued Aug. 9, 1989 to Wiley Jr. et al. and U.S. Pat. No. 4,945,818 issued Aug. 7, 1990 to Ware.

The Wiley Jr. et al. patent discloses the use of a magnetic system having a magnet attached to the brake push rod which moves with that push rod. A detector, which detects movement of the magnet, is placed in a fixed position with respect to the push rod. When an indication is received that the magnet, and hence the brake push rod, have moved beyond a pre-determined point, a visual or audible indicator is actuated in the truck cab to signal the operator of a brake problem. Movement of the brake push rod beyond a pre-determined point is an indication that the brakes have worn beyond a safe level, or that the brakes have been misaligned or are misadjusted in some manner, or that complete brake failure has occurred.

The Ware patent discloses the use of a physical indicia cut into the push rod at a pre-determined area of the push rod. This area will be exposed to the operator's view if the push rod is extended beyond a pre-determined point. Again, this provides an indication to the operator of a brake problem.

None of these prior art patents provide for the fixing of the break wear indication signal so that the signal remains on, once the push rod has moved beyond a pre-determined point, irrespective of subsequent positioning of the brake push rod. These prior art monitoring devices all have the disadvantage of switching off when the push rod is retracted after pressure is released from the brake, and there is no permanent indication that a dangerous brake situation has occurred.

There is a need for an apparatus to monitor brakes which will remain fixed in position, and thereby provide a constant signal, when the push rod has moved beyond a pre-determined position, thereby providing a permanent indication of excessive brake wear, misalignment or brake failure, irrespective of the subsequent positioning of the push rod.

SUMMARY OF THE INVENTION

In accordance with the invention, an apparatus for monitoring brake wear is provided for an air-actuated diaphragm spring brake having a push rod connecting the brake to the diaphragm, the push rod mounted for reciprocal movement between an operative position and an inoperative position. A first member is provided connected to the actuator having an opening for receiving the push rod for reciprocal movement therethrough. A second member is connected to the push rod for movement with the push rod between the operative position and inoperative position. The second member includes engaging means for engaging and retaining the second member with respect to the first member when the second member is reciprocated by the push rod to a first predetermined position with respect to the first member, the first predetermined position being indicative of an actuator potential brake problem. The engaging means retains the second member with respect to the first member irrespective of subsequent movement of the push rod. An alarm is provided and an alarm actuating means which is responsive to movement of the second member with respect to the first member for actuating the alarm when the second member is reciprocated beyond said first predetermined position, with respect to the first member.

DESCRIPTION OF THE PREFERRED EMBODIMENT(S)

A brake wear indicator for an air-actuated diaphragm spring brake system will now be discussed with reference to the drawings which show an air-actuated diaphragm spring brake actuator, of a conventional type, for mounting on the axle of a vehicle and for connection with, and actuation of, a vehicle braking system.

Figure 1:
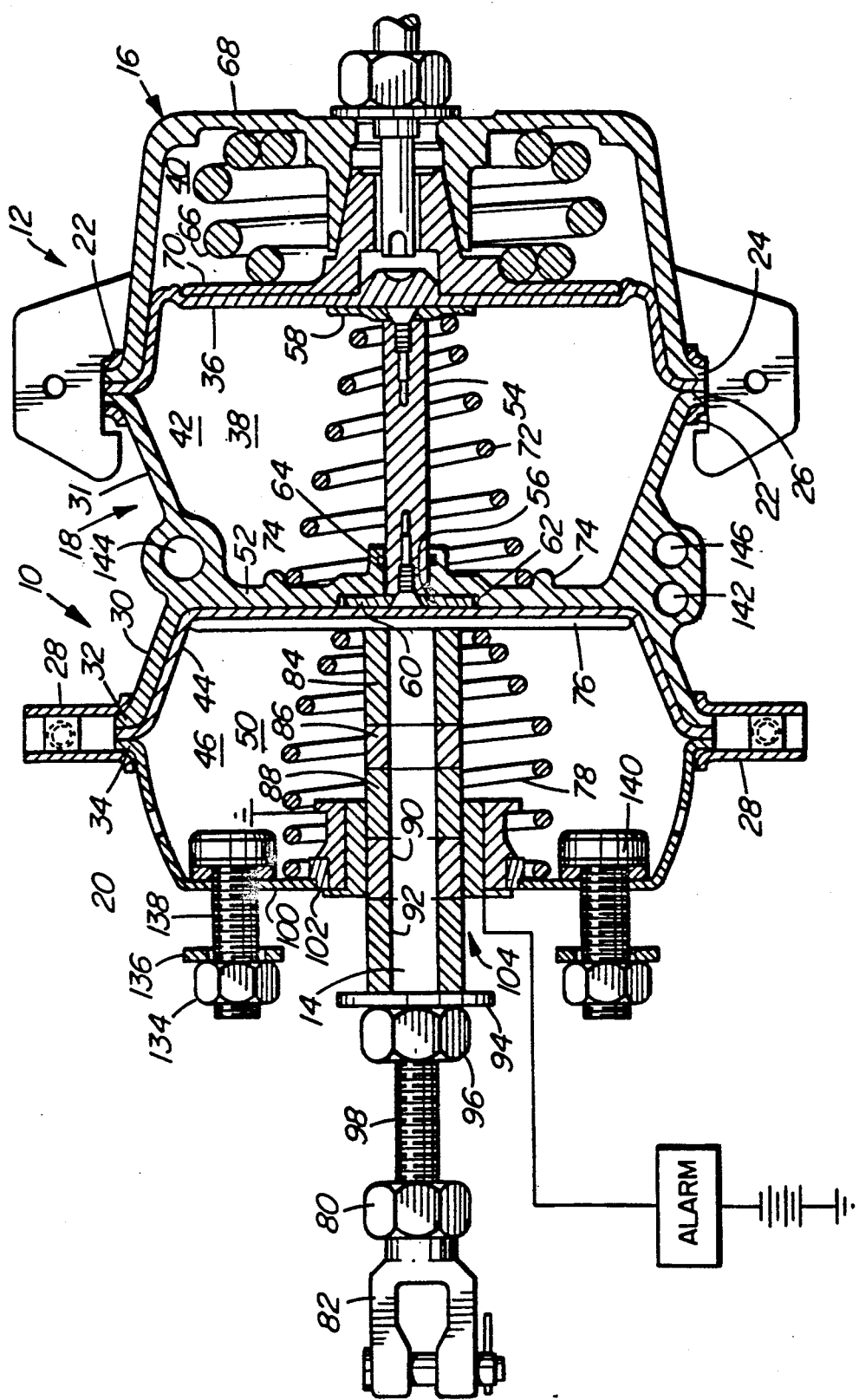
FIG. 1 is a cross-sectional view of an air-actuated diaphragm spring brake showing a brake wear indicator according to the invention with the brake released.
Figure 2:
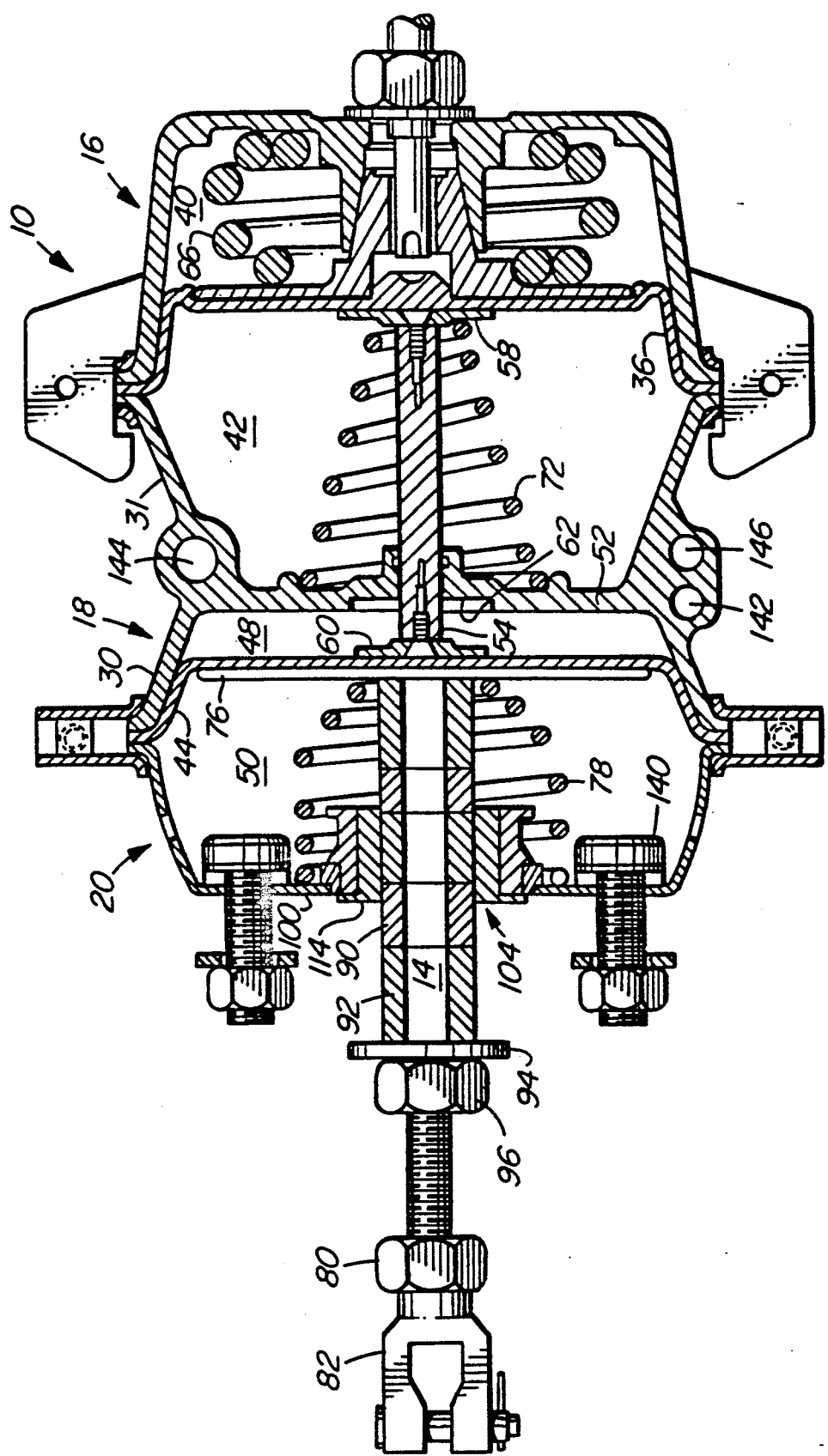
FIG. 2 is a cross-sectional view of the diaphragm spring brake of FIG. 1 in an operative position with brakes applied, the brakes being adjusted to a safe position and the indicator showing "green".

Referring initially to FIG. 1, an air-actuated diaphragm spring brake actuator is shown in cross-section generally at 10. Actuator 10 generally comprises brake housing 12 acting on push rod 14 to move push rod 14 between an inoperative position wherein the brakes of the vehicle are not applied (shown in FIG. 1) and an operative position in which the push rod 14 extends from housing 12 wherein the brakes are applied (as shown in FIG. 2).

Housing 12 and push rod 14 are conventional components found on standard air-actuated diaphragm spring brake actuators, and have been modified to accommodate the additional components of the invention as described herein.

Housing 12 is comprised of three components, upper housing assembly 16, connecting housing assembly 18 and lower housing assembly 20 joined together. Assembly 16 is connected to assembly 18 about their respective outer peripheries to form upper cavity 38. Upper diaphragm 36, described below, divides cavity 38 into upper cavity chamber 40 and lower cavity chamber 42. Upper clamp assembly 22 extends about the periphery of assemblies 16 and 18 to securely sandwich upper flange 24 and upper connecting flange 26 with the outer periphery of diaphragm 36 therebetween, to form an airtight lower cavity chamber 42 in the space enclosed by assembly 18 and diaphragm 36.

Assembly 20 is connected to assembly 18 about their respective outer peripheries to form lower cavity 46. Lower diaphragm 44, described below, divides cavity 46 into upper cavity chamber 48 and 50 (seen best in FIG. 2). Lower clamp assembly 28 extends about the periphery of assemblies 18 and 20 to securely sandwich lower connecting flange 32 and lower flange 34 with the outer periphery of diaphragm 44 therebetween to form an airtight upper cavity chamber 48 in the space enclosed by assembly 18 and diaphragm 44.

Figure 5:
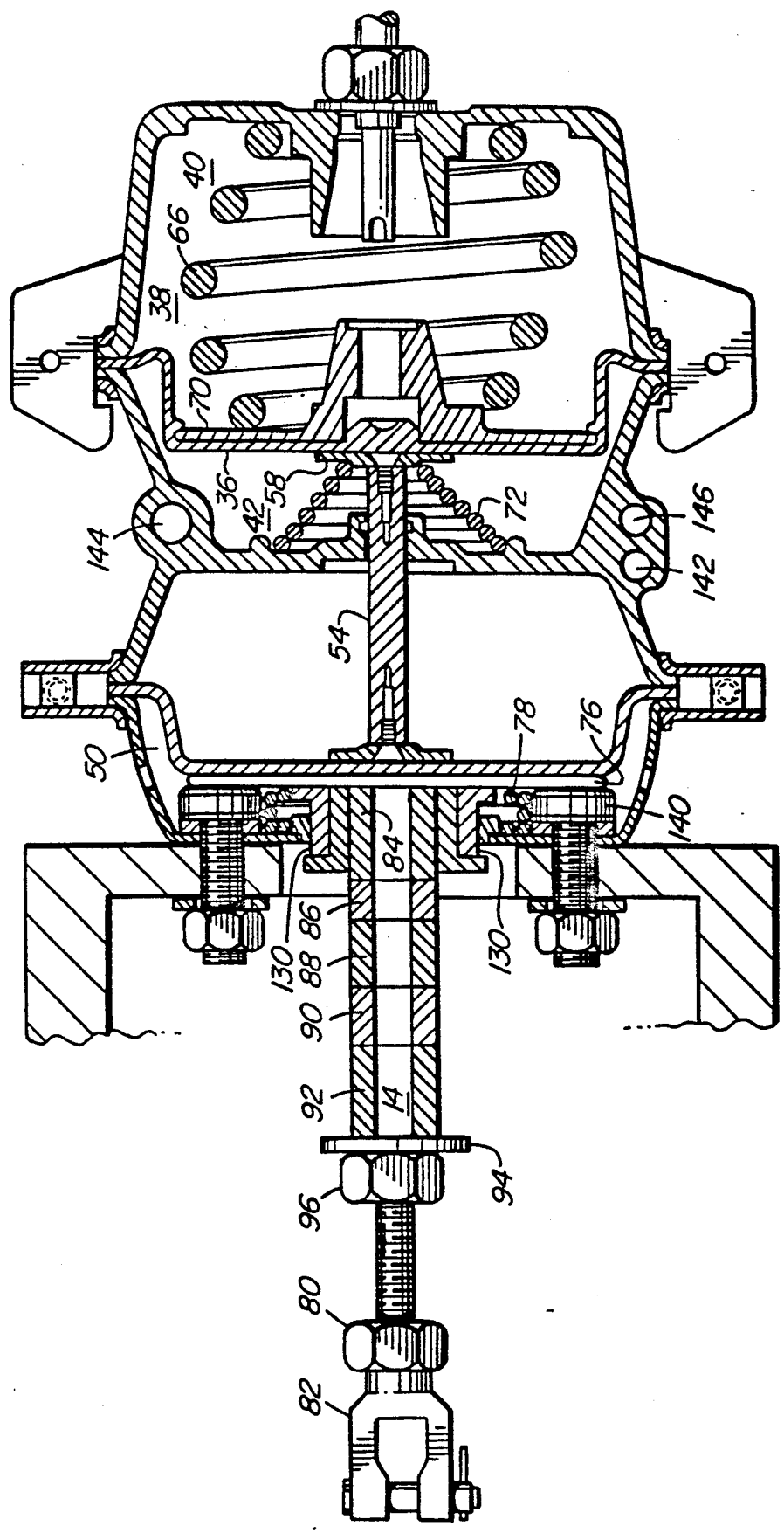
FIG. 5 is a cross-sectional view of a diaphragm spring brake with the parking or "maxi" brake applied, the brakes being in misalignment or misadjustment such that an indicator is fixed in position to show "red" continuously.

Upper diaphragm 36 is made of resilient flexible material and is attached within cavity 38 formed within assemblies 16 and 18. Diaphragm 36 forms an airtight seal to divide cavity 38 into upper and lower cavity chambers 40 and 42 respectively. Diaphragm 36 is sandwiched between flanges 24 and 26 to form an airtight seal and to maintain the outer periphery of diaphragm 36 between assemblies 16 and 18. Upper clamp assembly 22 provides clamping pressure on flanges 24 and 26 to maintain diaphragm 36 between said flanges. Diaphragm 36 is flexible to move within cavity 38 between an upper position, as shown in FIG. 1, and a lower position adjacent top portion 31, as shown in FIG. 5.

Similarly, lower diaphragm 44 divides lower cavity 46 formed and defined by bottom portion 30 and lower housing assembly 20. Diaphragm 44 is sandwiched between flanges 32 and 34 to form an airtight seal bisecting cavity 46. Cavity 46 is thereby divided into upper cavity chamber 48 and lower cavity chamber 50; best seen in FIGS. 2 and 3. Diaphragm 44 is made of resilient material and is flexible to move within cavity 46 to a position adjacent the inner wall of bottom portion 30 (as seen in FIG. 1) and a maximum lowered position substantially adjacent lower housing assembly 20 (as seen best in FIG. 4).

Connecting housing wall 52 separates cavities 38 and 46. Upper push rod 54 is positioned for reciprocal movement within cavities 38 and 46 through opening 56 in wall 52. Push rod 54 includes upper flange 58 attached laterally at the upper side adjacent diaphragm 36 and lower flange 60 attached to the lower end of push rod 54 adjacent the upper side of diaphragm 44. When push rod 54 is in its upper or inoperative position, as shown on FIG. 1, lower flange 60 seats within conforming cavity 62 in wall 52. An airtight seal is formed between push rod 54 and opening 56 by means of rubber O-ring 64 which permits slidable movement of push rod 54 between its upper (inoperative) and lower (operative) positions without air leakage through opening 56.

Figure 3:
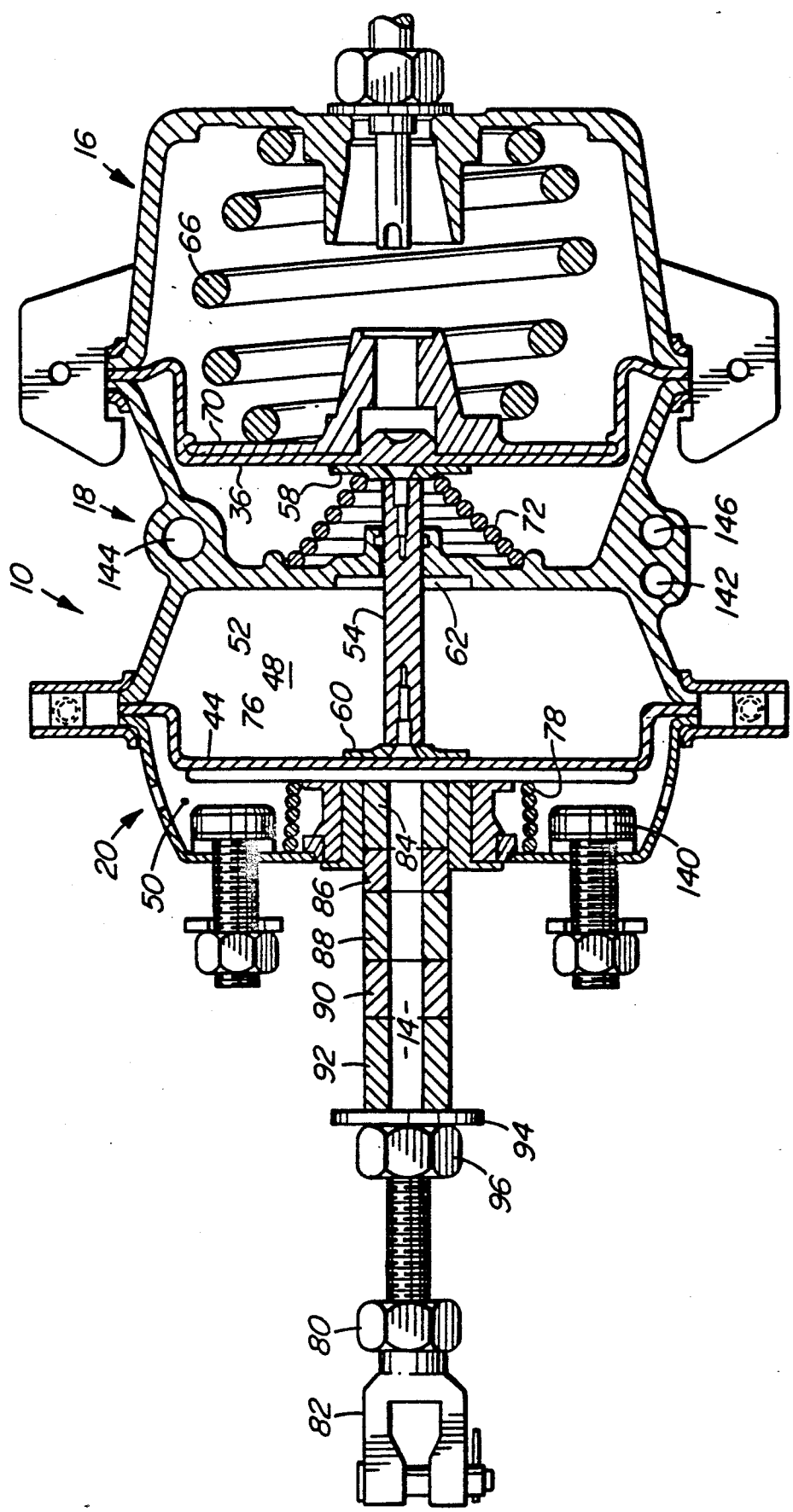
FIG. 3 is a cross-sectional view of a diaphragm spring brake of FIG. 1 in an operative position with the parking or maxi brakes applied, the brakes being in misalignment or misadjustment such that an indicator shows "red" when the brakes are applied, and retracts when the brakes are not applied.

Push rod 54 is shown in its upper position in FIG. 1 and in its lower position in FIG. 3.

Compression spring 66 is positioned within chamber 40 with one end contacting inner wall of top portion 68 of assembly 16. The other end of spring 66 contacts compression pressure plate 70 which is movable within cavity 38 on expansion and contraction of spring 66. Diaphragm 36 is sandwiched between pressure plate 70 in chamber 40 and by flange 58 in chamber 42. Compression spring 66 biases pressure plate 70 toward connecting housing assembly 18 thereby biasing flange 58 and push rod 54 to the lower or operative position, as shown in FIG. 3.

Compression return spring 72 is attached to the lower end of flange 58 at one end and to the upper side of wall 52 at the other end. Spring flange 74 on wall 52 constrains compression return spring 72 between flange 74. Return spring 72 biases flange 58 to the upper position as shown in FIG. 1. The upward bias force of spring 72 is less than the downward biasing force of spring 66 and sufficient air pressure is required in chamber 42 in order to asset spring 72 to overcome the biasing force of spring 66 to move spring 66 to its compressed position as shown in FIG. 2.

Push rod 14 extends from inside lower cavity 46 at an upper end out opening 102. The lower end of push rod 14 extends out of cavity 46 through opening 102 and has a threaded end 98 for receiving clevis locking nut 80, to which clevis assembly 82 is attached. Clevis assembly 82 is connected to the braking system (not shown) of the vehicle. When actuator 10 is in the inoperative position rod 14 is in its upper position and the brakes are not applied. When actuator 10 actuates the brake system rod 14 moves downward until brake contact is made to apply the brakes of a motor vehicle.

Push rod plate 76 extends from the upper end of push rod 14 in a lateral direction. Plate 76 is circular and substantially similar in shape to the bottom side of wall 52. Push rod return spring 78 is positioned within lower cavity chamber 50 with one end adjacent the lower side of plate 76 and the other end adjacent wall 100 of lower housing assembly 20. Spring 78 biases plate 76 to the upper position, as shown in FIG. 1. Spring 78 thereby biases diaphragm 44 to its upper position through pressure on diaphragm 44 by plate 76.

The upward bias force of spring 78 is less than the downward biasing force of spring 66 and sufficient air pressure is required in chamber 42 such that spring 72 may move push rod 54 to its upper position, in order to permit spring 78 and attached plate 76 to move diaphragm 44 to the upper position (FIG. 2.). As well, when spring 66 is extended to its extended position (as shown in FIG. 3), thereby pushing push rod 54 to the lowered position, spring 78 is compressed to its retracted position against the biasing force of spring 78. Concurrently, spring 72 is compressed to its retracted position against the biased force of spring 72.

Figure 6:
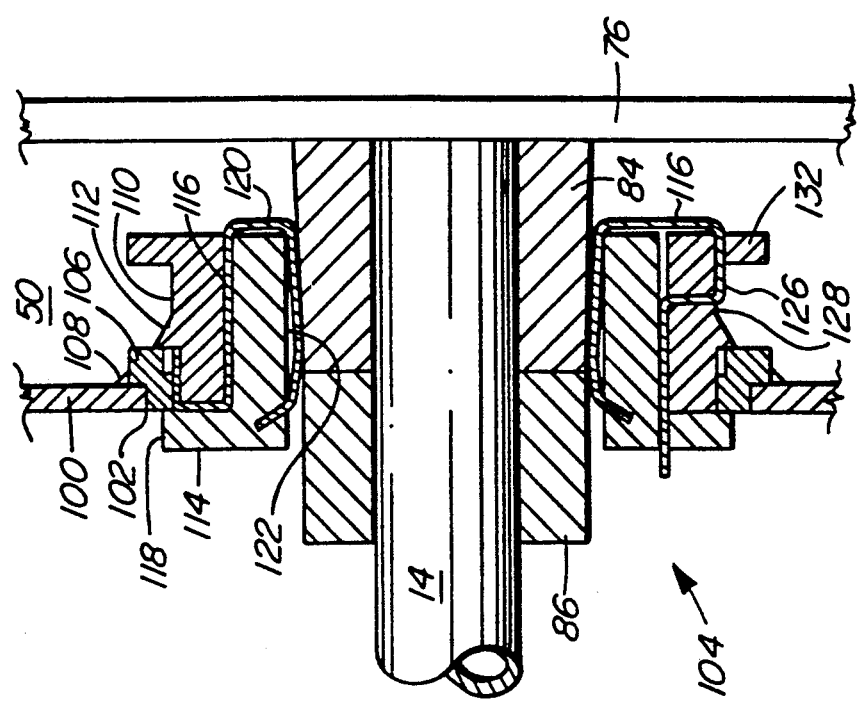
FIG. 6 is a close-up cross-sectional view of a portion of a diaphragm spring brake of FIG. 1 in an operative position with brakes applied, the brakes being in misalignment or misadjustment such that an indicator shows "red" temporarily when the brakes are applied, and retracts when the brakes are not applied.

The visual inspection sleeves encircling push rod 14, will now be discussed with reference to FIGS. 1 and 6. Electrical contact sleeve 84 encircles push rod 14 and is positioned adjacent plate 76. As seen in FIG. 6, sleeve 84 is tapered with the larger end adjacent plate 76 narrowing to a smaller diameter end opposite plate 76. Contact sleeve 84 is made of bronze and will conduct electricity to indicate a hazardous brake condition, as will be hereinafter described. Danger indication sleeve 86 encircles push rod 14 adjacent sleeve 84. Sleeve 86 has a similar outer circumference as the end of sleeve 84 adjacent sleeve 86. Sleeve 86 is red in color to provide visual indication of a dangerous brake condition. Caution indication sleeve 88 is positioned adjacent sleeve 86 and is of similar diameter as sleeve 86. Caution sleeve 88 is yellow in color and provides a visual indication of predetermined intermediate brake wear which alerts the operator to the potential of future dangerous brake condition so that appropriate adjustment or repair may be undertaken before a dangerous condition occurs. Safe indication sleeve 90 encircles push rod 14 adjacent sleeve 88. Sleeve 90 is of similar diameter as sleeve 88. Sleeve 90 is green in color to provide a visual indication of safe brake condition. Spacer sleeve 92 encircles push rod 14 adjacent sleeve 90. Sleeve 92 is of similar diameter as sleeve 90. Sleeve 92 acts as a spacer between safe indication sleeve 90 and washer 94 which retains sleeves 84, 86, 88, 90 =and 92 in juxtaposition against plate 96. Sleeves 86, 88, 90 and 92 are made of plastic or other non-conductive materials. Washer 94 is held tightly against sleeve 92 by nut 96 threaded onto threaded portion 98 of push rod 14.

The outer diameter of sleeves 86, 88, 90 and 92 are similar to form a relatively smooth outer surface to optimize sliding of the sleeves and rod 14 past ring 114 and surface 122 as rod 14 is moved between its operative and inoperative positions. As well, smaller diameter end of sleeve 84 is generally of the same diameter of adjacent sleeve 86 to optimize sliding of push rod 14. Alternatively, sleeves 84, 86, 88, 90 and 92 can be made of unitary construction with coloured bands thereon to correspond to the several sleeves discussed herein, provided that the upper portion of such unitary sleeve is of bronze or other electrical conducting material, and is tapered, to correspond to sleeve 84.

As will be appreciated by those skilled in the art, the outer diameter of sleeves 86, 88, 90 and 92 may be increased by enlarging opening 102 and the diameter of inner surface 122 of ring 114. Corresponding modification of spring 78 may also be made to accommodate larger diameter of sleeves 86, 88, 90 and 92 therein. Larger diameter sleeves 86, 88, 90 and 92 facilitate ready visual identification of the exposed colored surfaces of sleeves 86, 88 and 90.

The electrical connection for the remote danger indicator 104 will now be described with reference to FIGS. 1, 5, 6 and 7. The remote danger indicator 104 provides either an audible or visual signal of a dangerous brake condition, to the operator. The remote danger indicator 104 will operate intermittently to warn the driver of dangerous brake wear or other dangerous brake condition not yet severe enough to cause brake failure but intended to warn the driver that the brakes need adjustment or repair. The remote danger indicator 104, when fixed in place, remains activated on a continuous basis, providing a continuous indication to the operator and others who may wish to examine brake condition, of severe brake misalignment or damage or complete brake failure. Once fixed in place, the remote danger indicator 104 cannot be reset or turned off and provides continuous evidence that severe brake misalignment, damage or failure has occurred.

Lower portion 100 of assembly 20 includes a central opening 102 therethrough, through which push rod 14 and attached sleeves 84, 86, 88, 90 and 92 extend and retract and in which remote danger indicator 104 is fitted.

Opening 102 has been enlarged from the pre-existing opening of a standard brake actuator designed to accommodate only rod 14. As best seen in FIG. 6, steel ring 106 is welded about the circumference of opening 102 by weld 108. Ring 106 is constructed of steel and will conduct electricity when a current is applied. Red plastic indicator ring 110 fits within ring 106 and is held in place at the top of ring 106 by breakable protrusion 112. Inner black plastic indicator ring 114 is attached to ring 110 along connecting surface 116 adjacent ring 110. Lip 118 of ring 114 extends below ring 110 and a portion of ring 106 preventing movement of ring 114 and ring 110 upwardly into cavity chamber 50.

Copper wire 120 is connected to the negative terminal of the standard DC wiring system of the vehicle, or is attached to ground, as for example ring 106 as shown in FIG. 6. An intermediate portion of wire 120 extends along surface 116 over the top of ring 114. Wire 120 then extends downwardly between the inner surface 122 of ring 114 and the outer surface of sleeves 84, 86, 88, 90 and 92 on push rod 14 as push rod 14 is moved adjacent surface 122. Wire 120 contacts the outer surface of the sleeves as push rod 14 is moved between its extended and retracted positions.

Copper wire 124 is connected to the positive electrical system of the motor vehicle at one end and extends along surface 116 in an area generally opposed to wire 120, in an upward direction into chamber 50. Contact section 126 of wire 124 extends outwardly along outer surface 128 of ring 110 above protrusion 112. Wire 124 then extends inwardly to wrap about the top of ring 114 and then downwardly along surface 122 in an area generally opposite to wire 120 to contact sleeves 84, 86, 88, 90 and 92 as push rod 14 is moved between its extended and retracted positions.

Figure 7:
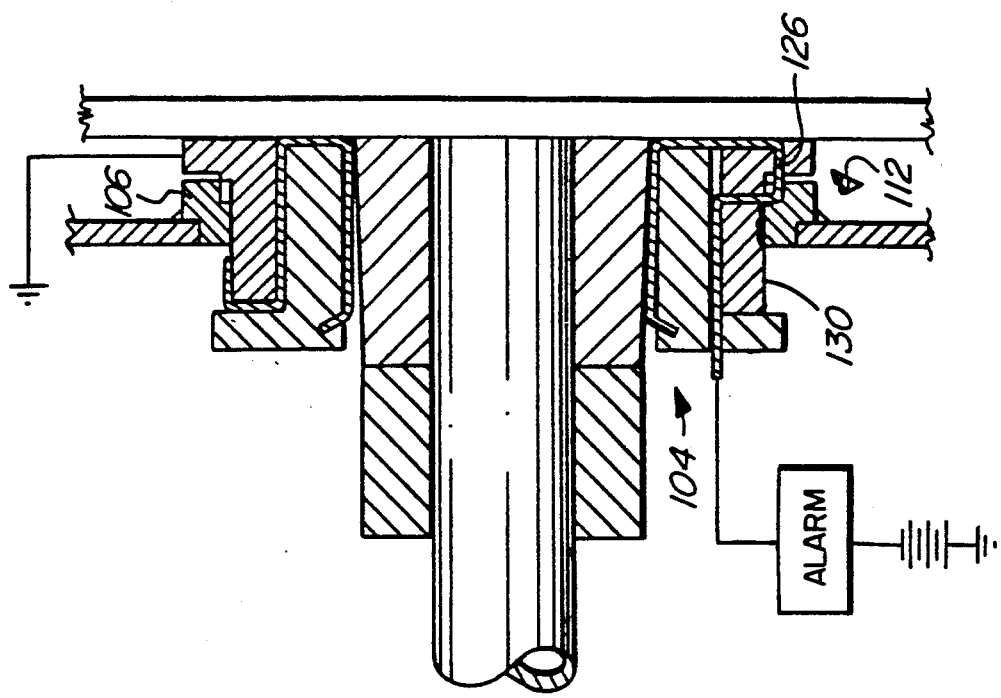
FIG. 7 is a close-up cross-sectional view of a portion of a diaphragm spring brake of FIG. 1 in an operative position with brakes applied, the brakes being in misalignment or misadjustment such that an indicator is fixed in position to show "red" continuously.

Referring to FIG. 7, when indicator 104 is moved to the fixed position, ring 110 is forced downward by excessive downward movement of push rod 14, which causes plate 76 to contact the upper surface of rings 110 and 114 thereby pushing protrusion 112 against ring 106 and breaking protrusion 112 off. This downward pressure jams the broken surface left when protrusion 112 is broken off forming a rough gripping surface, securely against the inner surface of ring 106, thereby securing indicator 104 in a lowered position secured to ring 106 (shown in FIG. 7). Outer indicator surface 130, which is red in color, is also simultaneously exposed to view below portion 100 to provide visual indication of the fixing of indicator 104. At the same time, contact section 126 is jammed into position to contact ring 106 which thereby grounds wire 126 to cause current to flow to the remote audible or visual indicator in the cab of the vehicle.

When push rod 14 is extended outwardly from portion 100 past a predetermined point, wires 120 and 124 contact sleeve 84 which is bronze and which conducts electricity. This causes an electric circuit to be completed and the visual or audible indicator to be actuated in the cab of the vehicle, thereby alerting the driver of a dangerous brake condition which should be repaired. Until ring 110 is fixed against ring 106, release of actuator 10 and corresponding upward movement of rod 14 and sleeve 84, will break the circuit and cause the remote indicator to turn off.

Rings 110 and 114 are prevented from further outward movement beyond a maximum Predetermined point, by lip 132 of ring 110 which contacts ring 106 on maximum downward movement of rings 110 and 114.

Air is supplied into chamber 48 through conduit 142, when the operator wishes to apply the brakes by pressing the brake peddle of the vehicle. Air pressure on diaphragm 44 causes diaphragm 44 to push plate 76 and push rod 14 downwardly to apply the breaks of the vehicle. Air is introduced into lower cavity chamber 42 through conduit 144 to provide sufficient air pressure within chamber 42 so as to permit spring 72 to bias spring 66 into its compressed position as shown in FIG. 1. In this position the parking or maxi break is in the inoperative position. A further conduit 146 is provided into chamber 42 to release air pressure from chamber 42 when the operator wishes to activate the parking or maxi break. Upon release of air pressure, spring 66 biases plate 70 downwardly against spring 72 to compress spring 72 as shown in FIG. 3, thereby causing push rod 14 to move to the operative position to apply the vehicle brakes.

Actuator 10 is mounted in a conventional way to the appropriate axle of a vehicle by means of nut 134, washer 136 and bolt 138 connected to portion 100 of actuator 10. Assembly 82 is connected to the brake assembly of the motor vehicle for inward and outward reciprocal motion with corresponding inward and outward reciprocal motion of push rod 14. Rubber stopper 140 is connected to the top of bolt 138 to act as a bumper to prevent further downward movement of plate 76 beyond a maximum predetermined distance.

OPERATION

FIG. 1 shows actuator 10 in an inoperative position, as when both the foot pedal brake and the parking brake are not applied by the operator. Air flows through conduit 144 into cavity 38 to create positive pressure in cavity 38. This pressure, together with biasing pressure of spring 72, overcomes the opposite biasing pressure of spring 66 to compress spring 66 and move plate 70 and diaphragm 36 upwardly toward spring 66. Spring 72 also maintains push rod 54 in the upper position which permits spring 78 to bias plate 76 in the upper or retracted position, thereby maintaining push rod 14 in the upper position. The brakes of the vehicle (not shown) are then in an inoperative position with no braking pressure applied.

Referring to FIG. 2, when the brakes are in proper adjustment, on application of the foot brake by the vehicle operator, air pressure is introduced through conduit 142 into upper cavity chamber 48 thereby forcing diaphragm 44 and plate 76 downwardly. This forces push rod 14 out until brake contact is made, thereby applying the brakes. When the brakes are properly adjusted push rod 14 will extend, and brake contact will be made, somewhere in the zone which exposes safe indication sleeve 90 in view, beyond the bottom edge of ring 114, thereby exposing green sleeve 90 to physical inspection. Alternatively, if the operator wishes to "test" the brakes, he can simply insert a pry bar in the usual manner to pull out push rod 14 until brake contact is made. He can then observe the sleeves to determine that sleeve 90 has been exposed in the manner described above, thereby indicating that the brakes are in proper adjustment. As the brakes go further and further out of adjustment, which occurs through normal wear of the brakes, more and more of push rod 14 will be exposed beyond ring 114. Eventually, caution indication sleeve 88, colored yellow, will be exposed to view. Sleeve 88 is positioned along push rod 14 to be exposed when brake wear is such that either brake adjustment or brake repair is required.

Figure 4:
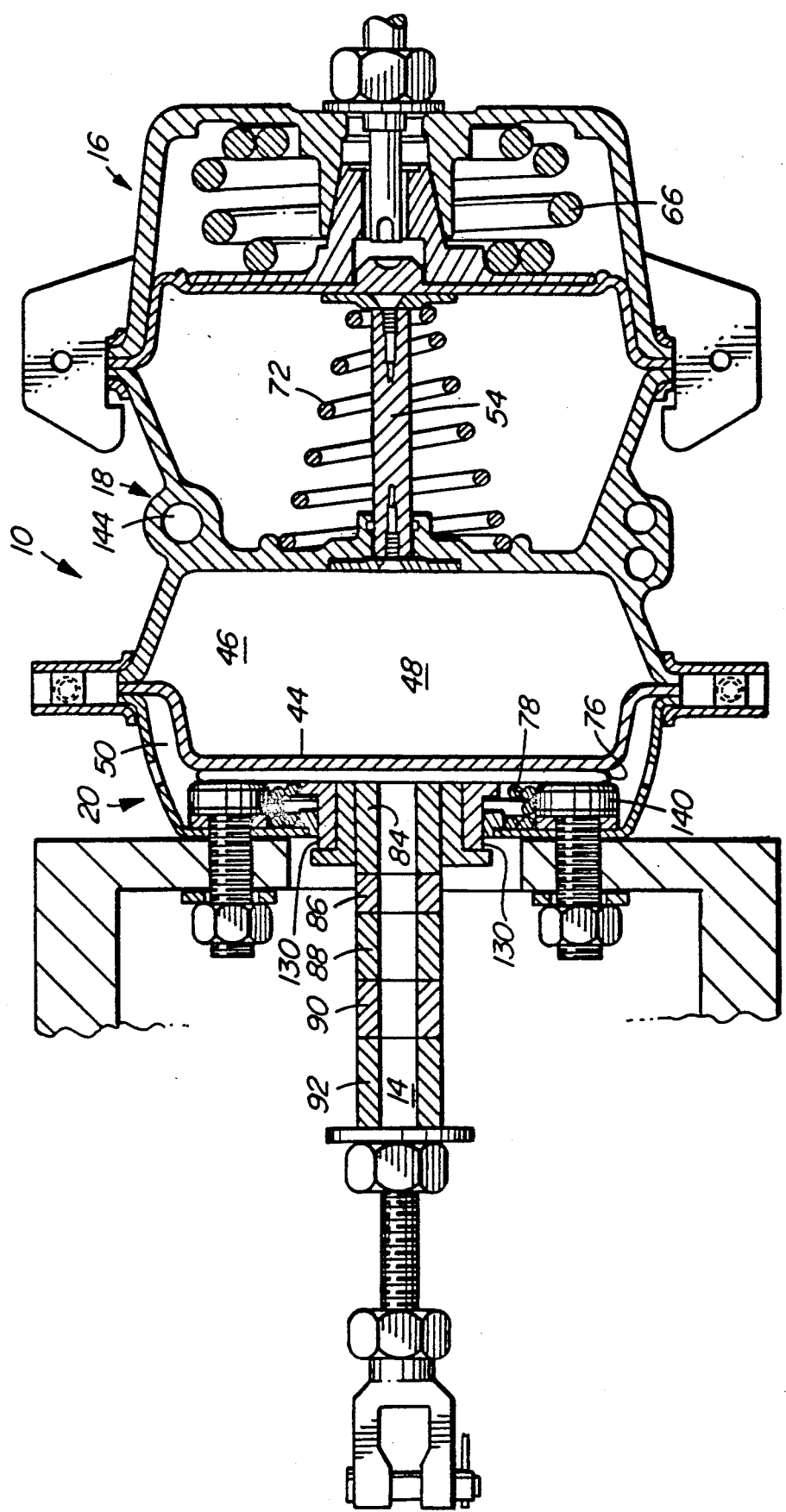
FIG. 4 is a cross-sectional view of a diaphragm spring brake of FIG. 1 in a operative position with brakes applied, the brakes being in misalignment or misadjustment such that an indicator is fixed in position to show "red".

Referring to FIG. 4, as brake wear increases or as the brakes go further out of alignment, the travel of push rod 14 increases in order to cause brake contact. In an extreme situation, where total brake failure has occurred, air pressure through conduit 142 will cause diaphragm 44 to push plate 76 until contact with bumpers 140 occurs. This forces ring 114 downwardly until lip 132 contacts ring 106. This downward movement also breaks off protrusion 112 thereby fixing ring 114, with respect to ring 106, with surface 130 exposed. Evidence of such brake failure is thereby fixed and remains so, while push rod 14 and adjacent sleeves are retracted as the brakes are released and air pressure in chamber 48 decreases causing return spring 78 to expand to the position shown in FIG. 1. Even with the retraction of push rod 14, indicator 130 remains exposed and the remote visual or audio indicator remains continuously actuated.

Referring to FIG. 3, the operator can also actuate the brake system by using his parking or maxi brake. On operation of the maxi brake actuator, air pressure in chamber 38 is released to atmosphere which enables spring 66, through downward biasing pressure, to act against spring 72 to move plate 70 downwardly. This also moves push rods 14 and 54 downwardly applying the brakes. With excessive brake wear, danger indication sleeve 86 is exposed to view by the operator on application of the parking brake, thereby exposing the color red to the operator's view alerting the operator to a dangerous brake condition. It can be appreciated that movement of Push rod 14, and sleeves 84, 86, 88, 90 and 92 will occur either on foot brake actuation or parking brake actuation by the operator, due to the conventional operation of actuator 10.

On push rod 14 being extended to a dangerous brake condition actuation of the audible or visual remote indicator will occur through contact of wires 120 and 124 with bronze sleeve 84, thereby completing the circuit and actuating the remote indicator.

When a predetermined severe brake misalignment or complete brake failure has occurred, plate 76 will contact rings 110 and 114 causing protrusion 112 to break off and jamming rings 110 and 114 securely against ring 106. This also causes contact section 126 to contact ring 106 thereby completing a circuit and causing continuous actuation of the remote visual or audio indicator. Thus, even when push rod 14 and the corresponding sleeves thereon are moved upward through return spring pressure caused by spring 78, as when the foot brake or maxi brake are released, the remote visual or auditory indicator remains actuated and visual indicator surface 130 remain exposed as a constant indication that severe brake misalignment or failure has occurred.

I claim:

1. An apparatus for monitoring brake condition for an air actuated diaphragm spring brake actuator having a push rod connecting the vehicle brake to the brake actuator, the push rod mounted for reciprocal movement between an operative position extending from said actuator and an inoperative position retracted within said actuator, comprising:
   (a) a first member connected to the actuator;
   (b) a second member cooperating with the first member having an opening for receiving said push rod for movement of said push rod between said operative position and said inoperative position therethrough;

(c) said second member movable with respect to said first member on application of pressure from said push rod;

(d) said second member comprising engaging means for engaging and retaining said second member with respect to said first member when said second member is moved by said push rod to a first predetermined position with respect to said first member corresponding to reciprocating movement of said push rod to a predetermined second operative position indicative of an actual or potential brake problem; and (e) said engaging means retaining said second member in a fixed position with respect to said first member irrespective of subsequent movement of said push rod.

2. An apparatus as described in claim 1, further comprising:

(a) an alarm; and (b) alarm actuating means responsive to movement of said second member with respect to said first member for actuating said alarm when said second member is reciprocated to or beyond said first predetermined position with respect to said first member.

3. An apparatus as described in claim 2, wherein said alarm actuating means comprises an electric circuit for supplying power to the alarm, the electric circuit including first and second contacts connected in series with said alarm, said second member connecting said first and second contacts together to complete said circuit when said second member is in said first predetermined position.

4. An apparatus as described in claim 2, further comprising a push rod cover comprising an electrical conducting portion and a non-electrical conducting portion and wherein said alarm actuating means comprises an electric circuit for supplying power to the alarm, the electric circuit including first and second contacts connected in series with said alarm, said second member connecting said first and second contacts together to complete said circuit when said second member is in said first predetermined position.

5. An apparatus as described in claim 4, wherein said non-electrical conducting portion comprises a series of colored bands to provide graduated visual indication of the brake condition as the push rod is moved to said operative position, said bands being of different visual indicia and of predetermined width to provide predetermined graduated visual indication of brake wear, as the push rod is moved to said operative position.

6. An apparatus as described in claim 2, wherein said engaging means comprises a breakable protrusion extending from said second member, adjacent said first member, said protrusion breaking off when said second member is moved with respect to said first member on application of pressure from said push rod, said protrusion forming a rough gripping surface on said second member when broken from said second member, said rough gripping surface engaging with said first member to retain said second member in said fixed position with respect to said first member, irrespective of subsequent movement of said push rod.

7. An apparatus as described in claim 2, wherein a portion of said second member is exposed to visual inspection when said second member is moved with respect to said first member to said first predetermined position on application of pressure from said push rod, said portion being colored for easy identification.

8. An apparatus as described in claim 1, wherein said engaging means comprises a breakable protrusion extending from said second member, adjacent said first member, said protrusion breaking off when said second member is moved with respect to said first member on application of pressure from said push rod, said protrusion forming a rough gripping surface on said second member when broken from said second member, said rough gripping surface engaging with said first member to retain said second member in said fixed position with respect to said first member irrespective of subsequent movement of said push rod.

9. An apparatus as described in claim 8, further comprising:

(a) an alarm; and (b) alarm actuating means responsive to movement of said second member with respect to said first member for actuating said alarm when said second member is reciprocated to or beyond said first predetermined position with respect to said first member.

* * * * *